(12) United States Patent
Miller

(10) Patent No.: US 8,940,949 B2
(45) Date of Patent: Jan. 27, 2015

(54) HYDROTHERMAL CONVERSION OF BIOMASS TO HYDROCARBON PRODUCTS

(71) Applicant: Gary Peyton Miller, Baton Rouge, LA (US)

(72) Inventor: Gary Peyton Miller, Baton Rouge, LA (US)

(*) Notice: Subject to any disclaimer, the term of this patent is extended or adjusted under 35 U.S.C. 154(b) by 105 days.

(21) Appl. No.: 13/625,824

(22) Filed: Sep. 24, 2012

(65) Prior Publication Data

US 2013/0079565 A1 Mar. 28, 2013

Related U.S. Application Data

(60) Provisional application No. 61/538,508, filed on Sep. 23, 2011.

(51) Int. Cl.
*C10G 1/04* (2006.01)
*C10G 1/02* (2006.01)
*C10G 1/06* (2006.01)
*C10G 3/00* (2006.01)

(52) U.S. Cl.
CPC *C10G 1/047* (2013.01); *C10G 1/02* (2013.01); *C10G 1/06* (2013.01); *C10G 3/40* (2013.01); *C10G 3/52* (2013.01); *C10G 2300/1011* (2013.01); *Y02E 50/343* (2013.01)
USPC ............. 585/240; 585/14; 585/638; 585/639; 585/733; 44/307; 44/308; 44/605; 588/312; 588/314; 588/317

(58) Field of Classification Search
USPC .......................... 585/14, 240, 638–639, 733; 44/307–308, 605; 588/312, 314, 317
See application file for complete search history.

(56) References Cited

U.S. PATENT DOCUMENTS

| | | | |
|---|---|---|---|
| 5,558,783 A * | 9/1996 | McGuinness | 210/761 |
| 6,172,272 B1 * | 1/2001 | Shabtai et al. | 585/242 |
| 2008/0071125 A1 | 3/2008 | Li | 585/361 |
| 2009/0012188 A1 * | 1/2009 | Rojey et al. | 518/700 |
| 2011/0232162 A1 * | 9/2011 | Siskin et al. | 44/307 |

* cited by examiner

*Primary Examiner* — Brian McCaig
(74) *Attorney, Agent, or Firm* — Henry E. Naylor

(57) ABSTRACT

A process for the conversion of biomass to hydrocarbon products such as transportation fuels, kerosene, diesel oil, fuel oil, chemical and refinery plant feeds. The instant process uses a hydrocarbon or synthesis gas co-feed and hot pressurized water to convert the biomass in a manner commonly referred to as hydrothermal liquefaction.

16 Claims, 1 Drawing Sheet

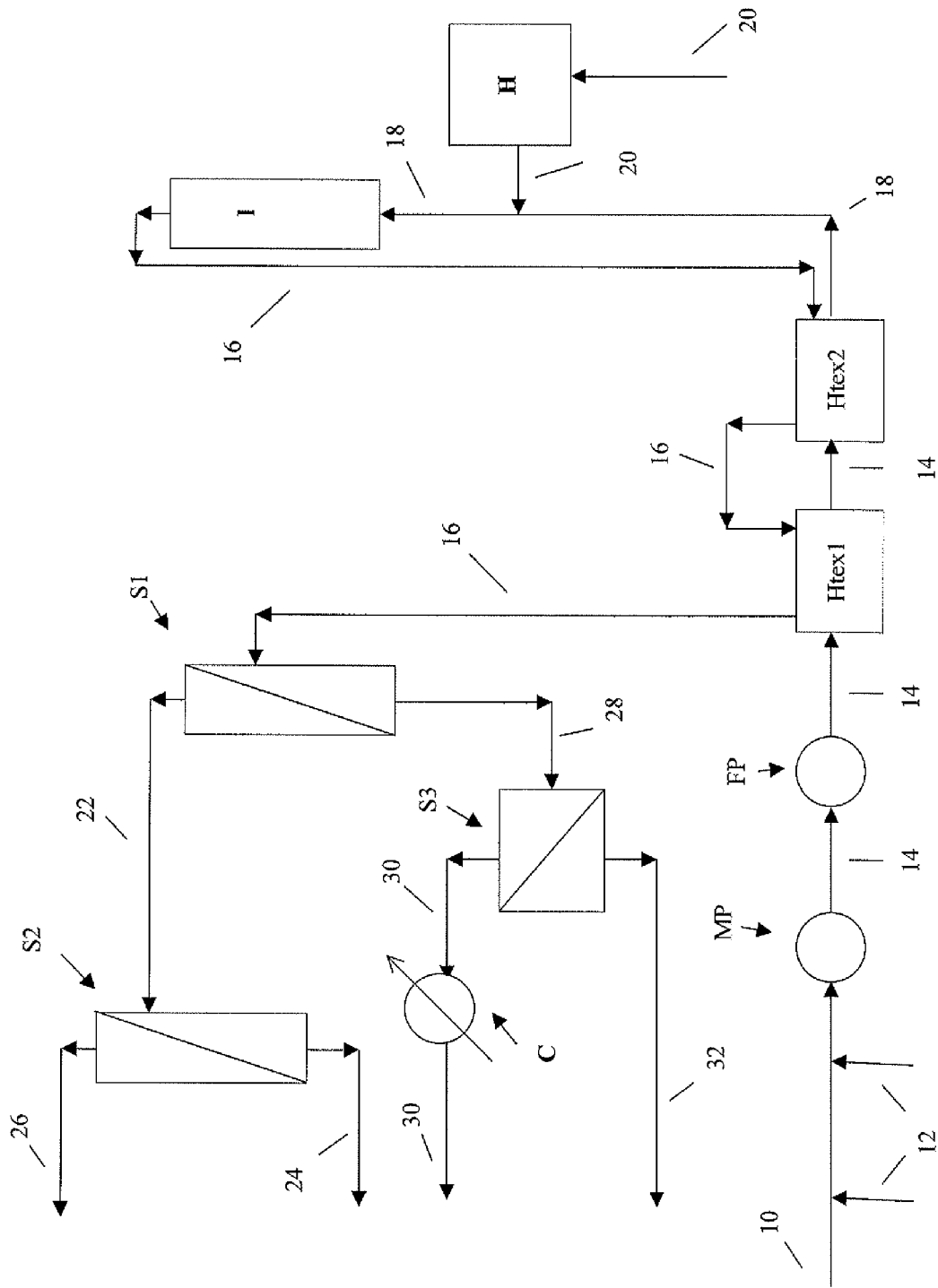

HYDROTHERMAL CONVERSION OF BIOMASS TO HYDROCARBON PRODUCTS

CROSS-REFERENCE TO RELATED APPLICATIONS

This application is based on U.S. Provisional Application 61/538,508 filed Sep. 23, 2011.

FIELD OF THE INVENTION

The present invention relates to the conversion of biomass to hydrocarbon products such as transportation fuels, kerosene, diesel oil, fuel oil, chemical and refinery plant feeds. The instant process uses a hydrocarbon or synthesis gas co-feed and hot pressurized water to convert the biomass in a manner commonly referred to as hydrothermal liquefaction.

BACKGROUND OF THE INVENTION

The conversion of biomass to hydrocarbon products is generally known in the art. For example, the U.S. Department of Energy tried to develop such a technology in 1977 and ran the Biomass Liquefaction Experimental Facility in Albany, Oreg. The project had limited success and achieved the production of a thick, oxygenated oil product that had little commercial value. Also, a Dutch consortium led by Shell Oil Company built a pilot plant in 2004 to convert biomass into diesel transportation fuel using the so-called Shell HTU® process, where HTU stands for hydrothermal upgrade. This was a two-step process that used hydrothermal treatment to create a thick, oxygenated oil product that was then deoxygenated and upgraded to produce a diesel fuel in a second step. The project was dropped presumably because of low conversion rates and high capital costs.

The conversion of biomass to hydrocarbon products is generally known in the art. For example, the U.S. Department of Energy tried to develop such a technology in 1977 and ran the Biomass Liquefaction Experimental Facility in Albany, Oreg. The project had limited success and achieved the production of a thick, oxygenated oil product that had little commercial value. Also, a Dutch consortium led by Shell Oil Company built a pilot plant in 2004 to convert biomass into diesel transportation fuel using the so-called Shell HTU® process, where HTU stands for hydrothermal upgrade. This was a two-step process that used hydrothermal treatment to create a thick, oxygenated oil product that was then deoxygenated and upgraded to produce a diesel fuel in a second step. The project was dropped presumably because of low conversion rates and high capital costs.

Further, two commercial facilities utilizing hydrothermal treatment technologies have been built and operated. The first was built in Rialto, Calif. using Enertech Environmental's Slurry Carb process to treat digested sludge from municipal sewage plants in the area. It produces a relatively low value, solid product that competes with coal as an energy product. The second facility was built in Carthage, Mo., using the Thermal Conversion Process from Changing World Technologies (CWT). This facility used waste turkey parts as a biomass feed to produce a diesel oil product of un-reported value.

While there is currently much interest in the hydrothermal treatment of biomass, no one has yet to develop a process that can produce usable energy products from biomass in a commercially viable manner. Therefore, there is a considerable need in the alternative fuels processing art for commercially viable processes for producing energy products from feedstocks, such as biomass.

SUMMARY OF THE INVENTION

In accordance with the present invention there is provided a process for the conversion of biomass to higher value hydrocarbon products, which process comprising introducing a biomass, an effective amount of water, and an effective amount of at least one co-feed into a reaction vessel operated at a temperature from about 200° C. to about 500° C., at a pressure greater than the saturated water vapor pressure within the reaction vessel, and at a residence time of about 1 to 30 minutes, thereby resulting in the conversion of said biomass to a hydrocarbon containing product stream.

Also in accordance with the present invention there is provided a process for the conversion of biomass to higher value hydrocarbon products, which process comprising;

i) conducting a feedstream of biomass and an effective amount of water into a reaction vessel;

ii) introducing an effect amount of a co-feed into the reaction vessel containing said biomass and effective amount of water, which co-feed is comprised of a syngas or a hydrocarbon represented by the chemical formula:

$C_xH_yO_z$ where x is equal to a whole number from 1 to 20; y is equal to a whole number from 2 to 42; and z is equal to 0, 1, or 2;

ii) operating the reaction vessel at a temperature from about 200° C. to about 500° C. and at a pressure equal to or greater than, thereby resulting in a heated hydrocarbon-containing product stream;

iii) conducting said hydrocarbon-containing product stream to a first separation zone wherein a gaseous fraction and a liquid fraction are separated wherein said gaseous fraction containing light hydrocarbons, and said liquid fraction is comprised of a hydrocarbon fraction, and a water fraction containing entrained solids;

iv) conducting said gaseous fraction from said first separation zone to a second separation zone wherein at least a light hydrocarbon fraction is separated from a flue gas fraction; and v) conducting said liquid fraction from said first separation zone to a third separation zone wherein at least a portion of said hydrocarbon fraction is separated from said water fraction containing entrained solids.

In a preferred embodiment, the co-feed is a syngas, preferably obtained as a product of steam reforming fossil fuels.

In another preferred embodiment, heat exchangers are used to provide heat to the feedstream being conducted to the reaction vessel by using at least a portion of the heated product stream exiting the reaction vessel as the heat transfer fluid in the heat exchangers.

BRIEF DESCRIPTION OF THE FIGURE

The sole FIGURE hereof is a simplified flow diagram of one preferred process scheme of the present invention.

DETAILED DESCRIPTION OF THE INVENTION

The present invention relates to a process for producing hydrocarbon products, such as those suitable for fuels, preferably transportation fuels, and refinery and chemical feedstocks, from renewable materials such as biomass originating from plants or animals. The term "hydrocarbon", as used herein, includes both chemical compounds that contain only hydrogen and carbon as well as those that include hydrogen, carbon and oxygen, which are sometimes referred to herein as oxygenated hydrocarbons. Non-limiting examples of the types of biomass that can be used in the practice of the present invention include plant biomass (defined below), animal biomass (any animal by-product, animal waste, etc.), municipal waste biomass (residential and light commercial refuse with recyclables, such as metal and glass removed), and municipal sewage sludge. The municipal sewage sludge (MSS) can be used alone as the feedstock or mixed with either municipal solid waste (MSW) or recycled material from MSW. Municipal sewage sludge, as used herein, refers to the slurry left behind in a sewage treatment plant after its load of human and industrial chemical wastes have been bio-chemically treated and the wastewater discharged. Sewage sludge often comprises organic materials composed mainly of crude proteins, lipids and carbohydrates, and inorganic materials, comprising significant quantities of silt, grit, clay and lower levels of heavy metals.

It is also within the scope of the present invention that bio-renewable fats and oils can be used as the feedstock, or as a co-feedstock. Such feedstocks can include any of those which comprise glycerides and free fatty acids (FFA). Most of the glycerides will be triglycerides, but monoglycerides and diglycerides may be present and processed as well. Examples of these renewable feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, jatropha oil, tallow, yellow and brown greases, lard, train oil, fats in milk, fish oil, algal oil, sewage sludge, and the like. Additional examples of renewable feedstocks include non-edible vegetable oils from the group comprising Jatropha curcas (Ratanjoy, Wild Castor, Jangli Erandi), Madhuca indica (Mohuwa), Pongamia pinnata (Karanji Honge), and Azadiracta indicia (Neem).

The term "plant biomass" refers to any cellulosic or ligno-cellulosic material and includes materials comprising hemi-cellulose, lignin, starch, oligosaccharides and/or monosaccharides. Biomass may also comprise additional components, such as protein and/or lipid. According to this invention, biomass may be derived from a single source, or it can be comprised of a mixture derived from more than one source. For example, biomass can be a mixture of corn cobs and corn stover, or a mixture of grass and leaves. Biomass also includes, but is not limited to, bioenergy crops, agricultural residues, municipal solid waste, industrial solid waste sludge from paper manufacture, yard waste, wood and forestry waste. Biomass can also include corn grain, crop residues such as corn husks, corn stover, potatoes and potato waste, grasses, wheat, wheat straw, barley, barley straw, hay, rice straw, switchgrass, waste paper, sugar cane bagasse, sorghum, soy, components obtained from processing of grains, trees, branches, roots, leaves, wood chips, sawdust, shrubs and bushes, vegetables, fruits, flowers, algae and animal manure. In one embodiment, biomass that is useful for the present invention includes biomass that has a relatively high carbohydrate value, is relatively dense, and/or is relatively easy to collect, transport, store and/or handle.

A preferred feedstock for the practice of the present invention is sewage sludge. The definitions of "sewage sludge" and "sludge" and "biosolids" under Title 40 of the Code of Federal Regulations, Part 257.2, hereby incorporated by reference, is as follows: "Sewage sludge means solid, semi-solid, or liquid residue generated during the treatment of domestic sewage in a treatment works. Sewage sludge includes, but is not limited to, domestic septage; scum or solid removed in primary, secondary or advanced wastewater treatment processes; and a material derived from sewage sludge. Sewage sludge does not include ash generated during the firing of sewage sludge in a sewage sludge incinerator or grit and screenings generated during preliminary treatment of domestic sewage in a treatment works. Sludge means solid, semi-solid or liquid waste generated from municipal, commercial, or industrial wastewater treatment plant, water supply treatment plant, or air pollution control facility or any other such waste having similar characteristics and effect."

For the purposes of the present invention, the term sludge also encompasses municipal dewatered biosolids, domestic septage, heat-dried biosolids, pharmaceutical fermentation wastes, microbial digests of organic products such as food stuffs, food byproducts, animal manures, digested animal manures, organic sludges comprised primarily of microorganisms, and any combination thereof.

There are several types of sludges that can be produced from sewage and/or wastewater treatment. These include primary sludge, waste activated sludge, pasteurized sludge, heat-treated sludge, and aerobically or anaerobically digested sludge, and combinations thereof. These sludges may result from municipal and/or industrial sources. Thus, sludges can comprise macromolecules including proteins. Sludges can also comprise personal pharmaceutical compounds, antibiotics, hormones, hormone-like molecules, other biologically active compounds, and macromolecules including proteins. Thus, a need exists for an effective, efficient, and economical process for treating sludges.

More preferred biomass feeds include sewage, potatoes, cow and hog manure, sugarcane bagasse, corn stover, beet pulp, algae and hay or other dried and baled grasses, a common reference is prairie grass.

The biomass is converted into useful products that can be used directly as a fuel or as a hydrocarbon mixture similar to light crude oil for feeding to conventional chemical and petroleum refining process equipment, such as distillation and reforming process units. It can also be converted to hydrocarbon materials that can be used as a platform chemical. The product streams from such process units can then be used for the production of more specialized hydrocarbons, such as chemical feedstocks or transportation fuels.

In general, the instant process, which can be catalytic or non-catalytic, involves forming a mixture or slurry of a biomass and an effective amount of water, then mixing it with at least one co-feed material and heating it to reaction temperatures while maintaining operating pressure equal to or greater than the saturated water vapor pressure. The pressure can be maintained above the critical pressure if the temperature is above the critical temperature. The present process is also conducted in the substantial absence of added oxygen. That is, the only oxygen present will be a chemical component of the biomass.

By effective amount of water we mean that minimum amount of water that will take the reaction out of the pyrolysis range to that amount that will make it too costly or too technically complicated. One technical problem that can arise if too little water is used is that it will be very difficult and costly to pump. The preferred amount of water for continuously operating reactors will range from about 50 vol. % to about 95 vol. %, preferably from about 70 vol. % to about 90 vol. % and the preferred amount of water for batch type reactors will range from 10 vol. % to about 95 vol. %, preferably from about 50 vol. % to 70 vol. %

An effective amount of at least one co-feed is used in the practice of the present invention. By an "effective amount of co-feed" we mean an amount ranging from ¼ the stoichiometric amount of carbon and hydrogen needed to convert substantially all of the oxygen into $CO_2$ and $H_2O$ to four times this stoichiometric amount. It is preferred that the amount of co-feed be substantially the stoichiometric amount needed to react substantially all of the oxygen plus the amount of co-feed necessary to run the process heater. At least a portion of any excess co-feed can be used to run the process heater.

The co-feed used in the practice of the present invention can be a suitable hydrocarbon material that is in a normally liquid or gaseous state, or a synthesis gas (syngas gas). If a syngas it is preferably that is be produced by steam reforming a fossil fuel, preferably natural gas or methane. By normally liquid or gaseous state we mean the state that it is in at substantially normal atmospheric temperatures and pressures. Preferred co-feed hydrocarbon materials suitable for use herein can be represented by the formula:

$$C_xH_yO_z$$

where x is equal to a whole number from 1 to 20, preferably 1 to 16; y is equal to a whole number from 2 to 42, preferably 4 to 32, and z is equal to 0, 1 or 2. It will be understood that the co-feed material can contain single, double, triple bonds or a mixture thereof. An effective amount of co-feed will be used.

It is preferred that the co-feed be a gas and that it be selected from the group consisting of methane, natural gas, ethane, propane, butane, acetylene, synthesis gas or any mixture thereof. Preferred liquid co-feed materials. It is to be understood that the co-feed can be a recycled gaseous or liquid fractions of a product or side stream of the present process. Although not wishing to be bound by theory, we believe the co-feed material provides several important functions that allow the biomass to be converted into higher value products that would otherwise not be produced if the co-feed were not present. It is believed that the co-feed acts to initiate one or more of the chemical reactions needed to convert the biomass more efficiently than if there were no co-feed present. Further, it is believed that the co-feed allows for more extensive removal of oxygen from the residual and allows for and promotes alkylation, such as methylation, of the biomass products, thereby resulting in higher valued hydrocarbon products having higher energy contents.

The present process is performed at a temperature from about 200° C. to about 500° C., preferably from about 250° C. to about 450° C., with reaction times ranging from about 1 minute to about 30 minutes, preferably from about 1 to about 20 minutes more preferably 1 to 10 minutes and most preferably 1 to 6 minutes. Of course the actual conditions used will depend on such things as the type of biomass being converted, the desired product distribution of the resulting hydrocarbon mixture, and the type of catalyst used, if any.

One advantage of the co-feed is that it serves as a reaction initiator. As the temperature increases, the co-feed starts to form radials and leads to the formation of a pool of H., CH3., and OH. radicals as illustrated by:

$CH_4+M \rightarrow CH_3.+H.+M$, where M is a third body and . denotes a free radical.

$CH_4+H. \rightarrow CH_3.+H_2$
$H.+H_2O \rightarrow H_2+OH.$
$CH_4+OH. \rightarrow CH_3.+H_2O$ These radicals will then be available to attack the biomass and convert the biomass to favorable products by promoting rapid depolymerization followed by deoxygenation, as illustrated by:

$CH_3.+O=R \rightarrow CH_2O+R.$, where $CH_2O$ is formaldehyde and $O=R$ is an aldehyde.
$CH_3.+OH—R \rightarrow CH_2O+R$, where $OH—R$ is an alcohol.
$H.+OH—R \rightarrow OH.+R$ $H.+O=R \rightarrow OH.+R.$
$H_2+OH—R \rightarrow H_2O+R$
$H_2+O=R \rightarrow H_2O+R.$
$CH_2O+H. \rightarrow CHO.+H_2$
$CHO.+H. \rightarrow CO+H_2$
$CO+O=R \rightarrow CO_2+R.$
$CO+OH—R \rightarrow CO_2+R$
$H_2+OH. \rightarrow H_2O+H.$
$R.+CH_3. \rightarrow R—CH_3$
$R. \rightarrow R'=R''$, R. leads to the formation of alkenes (R'=R").

The use of a co-feed also limits $CO_2$ formation by increasing $H_2O$ formation. The co-feed and it's $CH_3$ radicals are then able to alkylate the carbon-carbon double bonds as illustrated by:

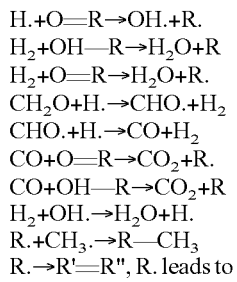

which gives more stable products with a higher energy content.

In this example, methane is used as the co-feed, but a similar depolymerization, deoxygenation reaction sequence and subsequent alkylation reactions will occur if another suitable co-feed, such as ethane, propane, butane, syngas or other light alkanes, alkenes, alcohols, esters or alkynes are used. Without the co-feed, the biomass will primarily decompose through thermal decomposition instead of the more preferable chemical decomposition route made available by use of the co-feed. Thermal decomposition would lead to an undesirable increase in $CO_2$ production and thermal cracking of the depolymerized biomass such that sufficient deoxygenation can not occur. Increased $CO_2$ production removes carbon that would otherwise become part of the higher valued product The use of a co-feed, and its resulting chemical radicals also allows for a controlled set of reactions to deoxygenate the biomass mixture while preserving the resulting hydrocarbon structures formed during the depolymerization step. These resulting hydrocarbons are similar to those found in crude oil and are a desired product produced by the instant process. The use of a co-feed also allows for product upgrade by methylation and alkylation. Without the co-feed, the biomass will undesirably decomposes, primarily through thermal decomposition with increased $CO_2$ formation which leads to undesirable thermal cracking of the underlying hydrocarbon structures such that sufficient deoxygenation cannot occur. Thus, the use of a co-feed reduces $CO_2$ formation, increases deoxygenation and promotes the production of products that preserves the underlying hydrocarbon structures.

As previously mentioned, use of a co-feed leads to depolymerization and a deoxygenation phase that leaves the underlying hydrocarbon structure in place. However, without the use of a co-feed this underlying hydrocarbon structure will contain a substantial amount of carbon-carbon double bonds, in compounds known as alkenes. Alkenes are less stable than alkanes. The co-feed also further increases the value of the product by replacing these undesired carbon-carbon double bonds through alkylation and methylation. This is done by replacing, or saturating, the double bond with a single carbon-carbon bond and adding a methyl or alkane group at the site of the old carbon-carbon double bond. The methyl, or alkane group, that is added will depend on the co-feed used. For example, using ethane as the co-feed will leave an ethane group at the site of the double bond while a methane group will be added when methane is the co-feed. Alkylation of the double bonds leaves the final hydrocarbon compounds with a higher energy content and eliminates the instability problems that alkenes are known to have. This improvement in the stability and energy content of the final product is another beneficial result of using a co-feed in the hydrothermal treatment of biomass process of the present invention.

Without the use of a co-feed the biomass will depolymerize substantially slower and in a much less organized manner. This will inevitably result in less valuable, highly oxygenated products and the loss of carbon by ejection of CO molecules. This CO formation results in further break-up of the biomass as $CO_2$ will be formed. The result will be less valuable products and the loss of an undesirably large amount of the biomass carbon to $CO_2$. The use of a co-feed alleviates both of these problems, resulting in more valuable products and a greater conversion of biomass carbon to valuable products instead of $CO_2$.

The inventor hereof has unexpectedly found that the use of a co-feed also avoids the formation of thick oxygenated oil that has been the conventional product of the hydrothermal treatment of biomass. Instead, as previously mentioned, the use of co-feeds produces much less $CO_2$, very low oxygen concentrations in the product, and a product with higher energy content. The result is a significantly higher conversion of the biomass carbon into a more useful and more valuable hydrocarbon product stream. Consequently, the final product can be used directly as a fuel, or is similar enough to light, sweet crude oil that it can be put into an existing petroleum refinery or petrochemical infrastructure for chemical, crude and refined oil products. Products produced from the conventional hydrothermal treatment of biomass, without the use of these co-feeds, by contrast, are of relatively low quality. Further, they typically cannot be processed in conventional petroleum refinery process units because of the incompatibility of their chemical make-up to petroleum based feedstocks.

The present invention can be better understood with reference to FIG. 1/1 hereof which is a simplified flow diagram of a preferred embodiment of the present invention. A biomass feed is conducted via line 10 to macerator pump MP wherein the biomass feedstream is comminuted to an effective size to the fed to reaction vessel. One or more co-feed materials can be introduced into line 10 via one or both of lines 12 prior to the biomass being macerated. A preferred biomass size after size reduction will be less than equal to or less than about ½ inch in length and less than or equal to about ¼ inch in height.

In a preferred embodiment two co-feed streams are used. The first is a natural gas stream and the other co-feed material is a syngas, preferably obtained from a steam reforming process, preferably the steam reforming of natural gas. Steam reforming is well known the art and generally refers to reacting steam at high temperatures with a fossil fuel, or biomass to form a gaseous mixture comprised of methane, ethane, propane, butane, carbon monoxide, carbon dioxide and hydrogen. A detailed discussion of process conditions and conventional catalysts is not necessary for purposes of the present invention.

The macerated biomass feedstream, along with the one or more co-feeds is conducted from macerator MP through heat exchangers Htex1 and Htex2 via line 14 by way of feed pump FP. The biomass/co-feed stream is heated in the heat exchangers by transfer of heat from heated product stream exiting reaction vessel R and conducted to the heat exchangers via line 16. Heat exchangers are well known in the art and any conventional heat exchanger suitable for the present process can be used. Non-limiting examples of heat exchanger designs suitable for use herein include shell and tube, plate and shell, plate fin, pillow plate, and spiral. Preferred are spiral heat exchangers.

The heated feedstream is conducted via line 18 to reaction vessel R which can be of any suitable reactor design and manufactured out of any suitable construction material, preferably a stainless steel. The present process can be operated in either batch or continuous mode, preferably in continuous mode. If the process is run in batch mode more than one reaction vessel can be employed wherein one reaction vessel can be taken off-line to remove product while the other one or more can be swung on-line to continue the process. It will be understood that more than one reactor can also be used in a continuous mode operation as well. An effective amount of water is conducted to reaction vessel R via line 20 where it is first passed through process heater H wherein it is heated to a temperature capable of providing at least a portion, preferably all, of the process temperature. In the event that the heated water via line 20 is not capable of maintaining process temperatures in the reaction vessel, it will be understood that any other suitable heating means, either direct or indirect, can provide additional heat to reaction vessel R. As previously mentioned, the reactive vessel will be maintained at a temperature from about 200° C. to about 500° C., preferably from about 250° C. to about 450° C., with reaction times (residence time of biomass in the reaction vessel) ranging from about 1 minute to about 30 minutes, preferably from about 1 to about 6 minutes.

The product stream, which will be at substantially the reaction temperature is conducted via line 16 through heat exchangers Htex1 and Htex2 where heat is transferred to the biomass/co-feed feedstream from the product stream. The product stream will be cooled by it passing through the heat exchangers. The substantially cooled product stream is passed via line 16 to first separation zone S1, which will preferably be a gas/liquid separation zone wherein a gaseous product stream will be separated from a liquid product stream, both of which will contain substantial amounts of hydrocarbons. The resulting gaseous product fraction, which will be comprised of material having an average boiling point less than about 85° C. is sent via line 22 to second separation zone S2. This gaseous product fraction from first separation zone S1 will be comprised of a variety of moieties including, but not limited to hydrogen, carbon dioxide, and hydrocarbons ranging from methane to pentane, benzene and pentenes. An additional liquid stream, comprised predominantly of light hydrocarbon (oil) is collected via line 24, which additional liquid stream will contain the heavier material from separation zone S2 and will be comprised of hydrocarbon material boiling in the range of about 25° C. to about 85° C. The gaseous product from separation zone S2 is collected via line 26, and is comprised of light ends having a boiling point less than about 25° C. and will contain such things as unreacted co-feed and other light hydrocarbons. At least a portion of this light ends stream can be recycled as fuel to process heater H.

The liquid faction product stream from first separation zone S1 will contain a hydrocarbon fraction and a water fraction containing entrained solids. This liquid product fraction is passed via line 28 to third separation zone S3 wherein the hydrocarbon fraction is separated from the water fraction. The water/oil mixture can be separated by any suitable separation technique, such as by use of a cyclone or by distillation. Distillation of preferred. The hydrocarbon fraction is passed via line 30 to storage after first preferably being further cooled via cooler C. A cooler is preferably used since the temperature of this hydrocarbon fraction will typically be from about 50° C. to about 150° C. and needs to be cooler to a desired temperature of about 20° C. to about 45° C. The water fraction containing entrained solids is passed via line 32 for storage, removal of solids, or conventional water treatment processing to be released into the environment.

The product make-up of line 26 will be comprised of gaseous hydrogen and hydrocarbons consisting of primarily methane, ethane, ethylene, propane, propenes, butane and butenes. The products in line 24 will be comprised of liquid hydrocarbons, primarily pentane, pentenes, cyclopentane, hexane, hexenes, cyclohexane and benzene. The products in line 30 will be comprised of alkanes, alkenes, cycloalkanes, aromatics, phenols, and these same chemicals in containing one to three oxygen molecules. The oxygenated compounds in this stream will be those with low or limited solubility in water. The products that remain in stream 32 will be oxygenated compounds that have moderate or high solubility in water, heavy oxygenated oils, asphaltenes and carbonaceous, sootlike material.

GENERAL PROCEDURES USED IN THE FOLLOWING EXAMPLES

Model GC-1 reactors having a reactor volume of 32 ml and associated equipment was obtained from High Pressure Equipment Company of Erie, Pa. The reactor was filled with a biomass/water mixture of varying types and concentrations. The reactor was then purged with an inert gas to replace the air and the associated oxygen. The reactor was next filled with a co-feed up to pressures of 10 bar gauge. The reactor, now charged with the co-feed, biomass and water, was immersed in a molten tin bath heated by a propane burner to the desired initial temperature. The reactor was held close to this initial temperature for two to five minutes while the reactor pressure built up to, or at near, the saturation pressure of water. The temperature of the tin bath was then increased to its final reaction temperature. The reaction time was two to twenty minutes depending on the desired final temperature and the biomass being tested. The biomass used for these tests were corn stover, algae and digested sewage. Tests were run both with and without catalyst. Other types of biomass were also run in similar tests both with and without catalysts.

Once the reactor had been held at reaction temperature in the tin bath for the predetermined time, the reactor was removed and cooled in a water bath at room conditions. Upon cooling, a head space sample was taken from the reactor. The reactor was then opened and the resulting liquid phase was removed and stored. On occasion, a heavier liquid phase remained in the reactor and was extracted with either hexane or toluene. The hydrocarbons in liquid phase were also extracted with hexane or toluene. The liquid phase was centrifuged and the amount of remaining solids was determined. The head space sample and any extracted phases were then analyzed using a Thermo/Fisons MD800 and GC 8000 gas chromatogram-mass spectrometer (GC-MS) in the full scan mode. Chromatographic conditions were as follows: capillary column (30 m; 0.25 mm id; 0.25 µm film); injector 250° C. temperature program 50° C. (4 min), ramp 4-6° C./min to 280° C. (5-20 min); sampling rate 4 Hz; and mass acquisition range 29-260 atomic mass units. Product identification was performed by comparison of experimental data with standards and computer databases of standards, and interpretation of mass spectra. The gas samples were run with no split flow at the GC inlet while split flow was used for the analysis of the extracted samples.

The following examples are presented as presenting only a few embodiments of the present invention and should not be taken as being limited in any way.

Example 1

In this experiment, algae was converted into hydrocarbon products using methane as a co-feed. One gram of dried algae, in a powder form, was mixed with 10 milliliters of water in a reactor vessel as previously described. The reactor was purged of air with helium. Methane was then added to the reactor until the reactor was pressurized to 9 bar of pressure gauge. The reactor was placed in a tin bath that was held at approximately 290° C. for three minutes. At that time, the temperature was raised to 370° C. The total time the reactor was in the tin bath was nine minutes.

The reactor was then placed in a water bath for rapid cooling to room temperature. A gas sample was taken from the reactor head space prior to opening the reactor. Upon opening the reactor a mixed liquid water, hydrocarbon phase was removed from the reactor and put in a centrifuge. After removal from the centrifuge the liquid phase was decanted leaving a solid, particulate layer at the bottom. The particulate layer was extracted with hexane, dried and weighed. An analysis of the products showed that approximately 60% of the product resulted in hydrocarbons and oxygenated hydrocarbons. The major products were identified and are shown in Table 1 below, which lists the products in order of product produced in highest quantity to that produced in least quantity. The major products listed in the table comprise over 80% of the total hydrocarbon, oxygenated hydrocarbon products produced.

TABLE 1

| Name | Chemical Compound |
|---|---|
| n-Hexadecanoic acid (Palmitic Acid) | $C_{16}H_{32}O_2$ |
| Carbon dioxide | $CO_2$ |
| 2-Hexadecene, 3,7,11,15-tetramethyl- | $C_{20}H_{40}$ |
| Heptadecane, 2,6-dimethyl- | $C_{19}H_{40}$ |
| 3,7,11,15-Tetramethyl-2-hexadecen-1-ol | $C_{20}H_{40}O$ |
| Dodecane, 2,6,10-trimethyl- | $C_{15}H_{32}$ |
| 5-Octadecene | $C_{18}H_{36}$ |
| Octane, 2,3,7-trimethyl- | $C_{11}H_{24}$ |

The above table shows the large degree of deoxygenation and alkylation that occurred due to the addition of the methane co-feed in the process. The large amount of palmitic acid remaining in the products suggests that more co-feed could be used in the process to fully deoxygenate and alkylate all the algae in the feed. The results show that the use of methane as a co-feed produced a high value product from the original biomass.

Example 2

Municipal sewage sludge was converted into hydrocarbon products using a methane co-feed. In this experiment, the process was run in a manner similar to that given in Example 1, with the difference being that 5.7 grams of a digested sludge/water mixture was used as the biomass feed and mixed with 5 milliliters of additional water in the reactor. This resulted in a product stream comprised of the hydrocarbons and oxygenated hydrocarbons as shown in Table 2 below, which lists the major components in the products from highest quantity to lowest.

TABLE 2

| Name | Chemical Compound |
| --- | --- |
| 2-Hexadecene, 3,7,11,15-tetramethyl- | $C_{20}H_{40}$ |
| 3,7,11,15-Tetramethyl-2-hexadecen-1-ol | $C_{20}H_{40}O$ |
| Carbon dioxide | $CO_2$ |
| n-Hexadecanoic acid (Palmitic Acid) | $C_{16}H_{32}O_2$ |
| Pentadecane, 7-methyl- | $C_{16}H_{34}$ |
| 1-Tetradecene | $C_{14}H_{28}$ |
| 1-Octadecene | $C_{18}H_{36}$ |
| 1-Pentadecene, 2-methyl- | $C_{16}H_{32}$ |
| Dodecane, 2,6,10-trimethyl- | $C_{15}H_{32}$ |
| Butanal, methyl- | $C_5H_{10}O$ |
| 1-Decene | $C_{10}H_{20}$ |
| Octane, 2,3,7-trimethyl- | $C_{11}H_{24}$ |

Table 2 above shows the large degree of deoxygenation and alkylation that occurred due to the addition of the co-feed methane in the process. The presence of alkenes and the alkyne, 9-Ocadecyne, suggest that an increased percentage of co-feed could be used to further alkylate the biomass into more stable alkanes. The results show that digested municipal sewage sludge can be converted to valuable energy products using a co-feed as described in this invention.

Comparative Example

For a comparative example, digested municipal sewage sludge was reacted under the same conditions as those in Example 2 above but without the use of a co-feed. The results showed that without the use of a co-feed carbon dioxide was the primary product. Some volatile compounds were also produced, but there were no measurable semi-volatiles produced. Most of the carbon in the sewage sludge ended up as carbon dioxide, a carbonaceous, soot-like material, asphaltenes and pre-asphaltenes. The comparative example evidences that without the use of a co-feed, the result was products of substantially lower value than those produced when using a co-feed with the same biomass feed and reaction conditions. Table 3 below shows the results of this comparative example using municipal sewage sludge as the biomass feed.

TABLE 3

The compounds listed below are in order starting with the compound found in the largest quantity to that found in the lowest quantity.

| Name | Chemical Compound |
| --- | --- |
| Carbon dioxide | $CO_2$ |
| Isopropyl alcohol | $C_3H_8O$ |
| Propane | $C_3H_8$ |
| Methanethiol | $CH_4S$ |
| Propanal, 2-methyl- | $C_4H_8O$ |
| Furan | $C_4H_4O$ |

The compounds listed below are in order starting with the compound found in the largest quantity to that found in the lowest quantity.

What is claimed is:

1. A process for the conversion of biomass to higher value hydrocarbons and oxygenated hydrocarbon products, which process comprises:
   i) conducting a feedstock of biomass and an effective amount of water into a reaction vessel;
   ii) introducing an effective amount of a co-feed into the reaction vessel containing said biomass and an effective amount of water, which co-feed is comprised of a syngas or a material represented by the chemical formula:

$C_xH_yO_z$ where x is equal to a whole number from 1 to 20; y is equal to a whole number from 2 to 42; and z is equal to 0, 1, or 2;
   iii) operating the reaction vessel at a temperature from about 200° C. to about 500° C. and at a pressure equal to or greater than the saturated water vapor pressure within the reaction vessel, thereby resulting in a heated hydrocarbon-containing product stream;
   iv) conducting said hydrocarbon-containing product stream to a first separation zone wherein a gaseous fraction and a liquid fraction are separated, wherein said gaseous fraction contains light hydrocarbons and said liquid fraction is comprised of a hydrocarbon fraction, and a water fraction containing entrained solids;
   v) conducting said gaseous fraction from said first separation zone to a second separation zone wherein at least a light hydrocarbon fraction is separated from a flue gas fraction; and
   vi) conducting said liquid fraction from said first separation zone to a third separation zone wherein at least a portion of said hydrocarbon fraction is separated from said water fraction containing entrained solids.

2. The process of claim 1 wherein the biomass is selected from the group consisting of: plant biomass, bio-renewable fats and oils, animal biomass, municipal waste biomass, and sewage sludge.

3. The process of claim 2 wherein the biomass is sewage sludge.

4. The process of claim 3 wherein the selected from the group consisting of municipal dewatered biosolids, domestic septage, heat-dried biosolids, pharmaceutical fermentation wastes, microbial digests of organic products, food by-products, animal manures, digested animal manures, organic sludges comprised primarily of microorganisms and mixtures thereof.

5. The process of claim 3 wherein the sludge is produced from sewage or wastewater treatment and is selected from the group consisting of primary sludge, waste activated sludge, pasteurized sludge, heat-treated sludge, and aerobically or anaerobically digested sludge, and mixture thereof.

6. The process of claim 1 wherein the biomass is selected from the group consisting of sewage, potatoes, cow and hog manure, sugarcane bagasse, corn stover, beet pulp, algae and hay or other dried and baled grasses.

7. The process of claim 1 wherein the co-feed is a syngas obtained from the steam reforming of a fossil fuel.

8. The process of claim 7 wherein fossil fuel is natural gas.

9. The process of claim 1 wherein the co-feed is a gas.

10. The process of claim 9 wherein the co-feed gas is selected from the group consisting of methane, natural gas, ethane, propane, butane, acetylene, and mixtures thereof.

11. The process of claim 1 wherein the co-feed is a liquid.

12. The process of claim 11 wherein the liquid is selected from the group consisting of methanol, ethanol, hexane, acetone, toluene, palmitic acid, and mixtures thereof.

13. The process of claim 1 wherein the co-feed is a recycled fraction of gas or liquid product.

14. The process of claim 1 wherein the reaction vessel is operated at a temperature from about 250° C. to about 450° C.

15. The process of claim 14 wherein the residence time of biomass in said reaction vessel is from about 1 minute to about 30 minutes.

16. The process of claim 1 wherein the co-feed is selected from the group consisting of ethane, propane, butane, syngas or other light alkanes, alkenes, alcohols, esters an alkynes.

* * * * *